March 8, 1966 S. NAPOLIN 3,239,729

TUNER HAVING SCREW-DRIVEN RECIPROCATING TUNING CAPACITOR

Filed Dec. 2, 1963 2 Sheets-Sheet 1

INVENTOR
SEYMOUR NAPOLIN
BY [signature]
ATTORNEY.

TUNER HAVING SCREW-DRIVEN RECIPROCATING TUNING CAPACITOR

Filed Dec. 2, 1963 2 Sheets-Sheet 2

INVENTOR
SEYMOUR NAPOLIN
BY [signature]
ATTORNEY.

3,239,729

TUNER HAVING SCREW-DRIVEN RECIPROCATING TUNING CAPACITOR

Seymour Napolin, Westbury, N.Y., assignor to Melsey Corporation, Westbury, N.Y., a corporation of New York

Filed Dec. 2, 1963, Ser. No. 327,400
1 Claim. (Cl. 317—249)

This invention relates to means and methods for producing control in the reception and transmission of electrical signals and in particular is directed to the production of precision coaxial tuning elements in the control of electrical signals.

Tuning elements in the electronic art for the control of electrical signals invariably involve tunable capacitor and inductor elements in combination and their variation relative to each other. Such variations are usually effected by combinations of coaxial elements, capacitive or inductive, wherein both elements are usually rotatable relative to each other, and where the elements are further disposed to be contacted to effect the change thereof, capacitively or inductively to thereby effect the necessary frequency change regarding the electrical signals. Hence, there is both rotational effects and contact effects of the frequency changing elements which thereby give rise to certain defects such as noise, distortion, coarse control, especially in the high frequency regions. Since the elements are rotatable relative to each other, precision in manufacturing the respective coaxial parts must be maintained in order to maintain frequency accuracy of the electrical signals, thus necessitating relatively high costs.

To obviate these limitations, the applicant has provided a tuning mechanism which has respective tuning elements that are variable with respect to each other but wherein no rotation is or can be effected. The combination of elements comprises a pair of elongated cylindrical elements, one concentrically surrounding the other, the pair being longitudinally or axially movable with respect to each other. The inner member is made to have its inner surface threadably engage a screw type shaft pivotally fixed at one location to prevent its axial movement when rotated with respect to the said inner member. The rotational movement of the shaft causes the inner member to traverse an axial path to effect a change in space variation between the inner and outer cylindrical elements to thereby effect a change in capacity and/or inductance or both.

It is, therefore, a principal object of the invention to provide an improved tunable system for electrical signals in the transmission and reception thereof.

Another object of the invention is to provide a tunable structure for electrical signals which is simple, accurate, economical and easy to operate.

Another object of the invention is to provide a combination of tunable elements for the transmission and reception of electrical signals which produces less noise and distortion over the tunable frequency of the respective elements.

Other objects and advantages will become more apparent from a reading of the specifications and a study of the accompanying drawings and wherein.

Figure 4A:
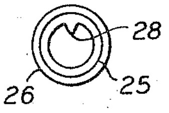
Figure 4B:
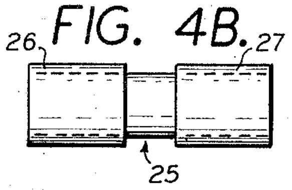

FIGS. 4*a* and 4*b* show the plan and end view of a tubular dielectric member surrounded by spaced metal bands, the said dielectric member and bands having groove and ridges respectively in contact.

Figure 5A:

FIGS. 5 and 5*a* show the plan and end views of plunger and an arrangement for its mounting to restrict its axial movement and not its rotational movement.

Figure 6:
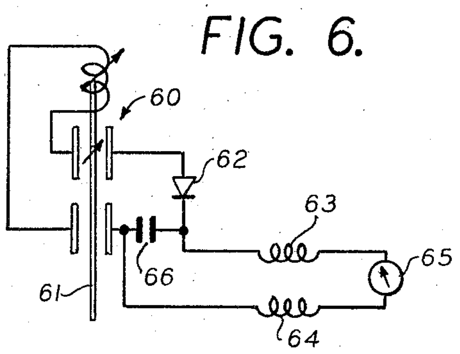

FIG. 6 is an equivalent circuit of the tunable elements according to the invention.

Figure 7:
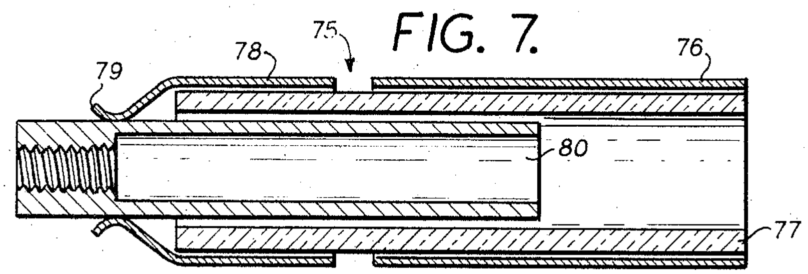
Figure 7A:
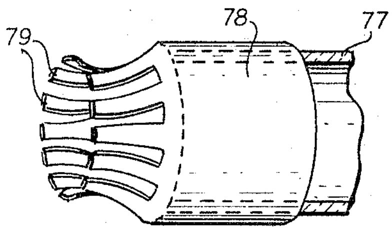

FIGS. 7 and 7*a* show another embodiment of the invention wherein the stator and plunger mechanism are in conductive contact to produce an extended tunable frequency range.

Figure 1:
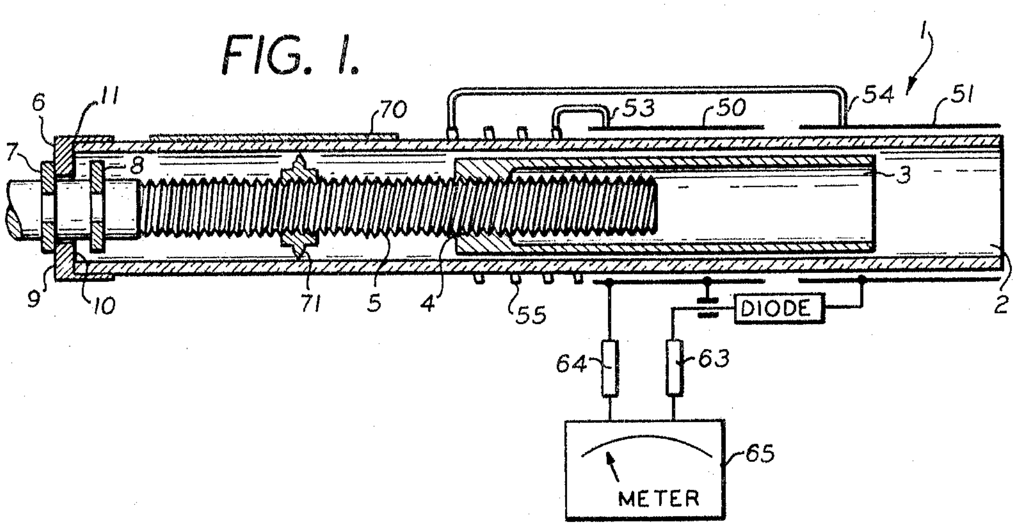
FIG. 1 shows the tunable structure according to the invention.

Now proceeding to describe the invention as embodied in the above numbered figures, there is shown in particular in FIG. 1 a tunable structure 1 comprising an elongated tubular vitreous or glass-like member 2 having internal and axially movable relative thereto a tubular plunger-like member 3 made of electrically conductive material disposed to vary the electrical and frequency characteristics of inductive and capacitive elements coupled thereto. The said plunger 3 is further disposed to having its internal surface 4 threaded in screw-like fashion for receiving a threadable shaft 5 supported by and anchored to one extremity 6 of the said plunger 3. The shaft at the anchoring point is still further disposed to having a pair of anchoring rings 7, 8 each radially embedded in the said shaft on opposing sides 9, 10 of the sealing or terminating closure 11 of the said plunger. Rotational movement of the shaft does not affect its axial movement, since this is fixed or stabilized by the retaining rings, whereas the said rotational movement permits a screw-like engagement of the shaft with the plunger and thus causes an axial movement of the plunger. To further assure that rotational movement of the shaft does not cause rotational movement of the plunger but that such rotational movements are entirely translated into axial movements only, there is provided a retaining mechanism between the said plunger 3 and tubular member 2. The retainer is effective in avoiding any rotational movements of the plunger as it traverses its axial direction.

A form of retainer may be effected by the arrangement of an elongated longitudinally (axially) oriented groove and ridge, on both the tubular member 2 and plunger 3. It does not much matter upon which item the groove or ridge resides, providing that both are in harmony or suitable engagements, and form a keyway designed to prevent the movement previously mentioned.

To assure an appropriate ridge and groove assembly, there is provided a method for making a very accurate glass ridge or groove suitable for the said plunger which will maintain the movements previously mentioned. In particular, a length of glass tubing dimensioned close to the final dimensions is slipped over a steel rod or mandrel. It is assumed that a ridge of glass is desired that runs lengthwise down the inside surface of the tube, the mandrel would be fabricated with a narrow groove the length of the mandrel. One end of the glass tube is made air-tight to the mandrel. A vacuum pump would be connected to the other end of the glass tubing. Heat is then applied close to the sealed end of the tubing. As the glass softens, heat is applied progressively down the length of the tube. The vacuum sucks the softened glass to the mandrel and fills the groove as the heat is progressively applied. After cooling, the glass is removed from the mandrel. Removal is possible only because the coefficient of expansion of the mandrel is greater than the glass tube. In the cooling process, the softened glass solidifies at a discrete temperature. As cooling progresses, the mandrel shrinks away from the glass, leaving a clearance sufficient for removal. This process permits inside diameter contour accuracies that are very high.

Figures 2, 3:
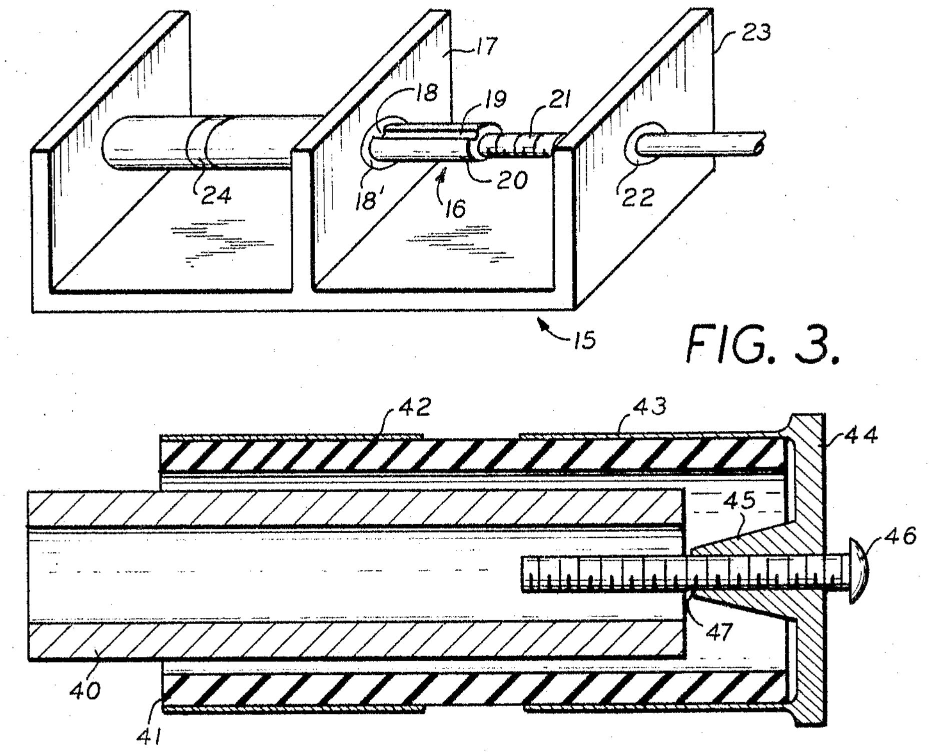
FIG. 2 shows how the tunable structure is mounted to a typical housing for mounting purposes.
FIG. 3 shows another embodiment of the tunable structure of the invention.

From the foregoing, the keyway and groove formation may appear to be a continuous elongated affair, however this is not necessarily the case as for example the assembly drawing shown in FIG. 2. This figure in particular shows a retaining or mounting structure 15 which carries the tunable asesmbly 16. In particular, the structure 15 has a mounting plate 17 to which is centrally and fixedly attached a washer-like member 18 having a small protrusion or ridge 18 disposed to traverse the elongated groove 19 on plunger 20, as the said plunger is caused to move by the rotation of threadable shaft 21. The shaft 21 is free to rotate about a bearing point 22 attached to another mounting plate 23, forming an integral part of the structure 15, and threadably engage the inner threaded surface of the plunger 20, the said shaft causing the said plunger to axially move due to its rotational action, but itself not undergoing any axial movements. The axial movements of the plunger 20 is designed to change the capacitive or inductive elements carried by sleeve member 24, the plunger moving axially within the said sleeve and relative thereto. From the above, it may be noted that the key or ridge is only a small part of the elongated groove in the plunger member.

Figure 5B:
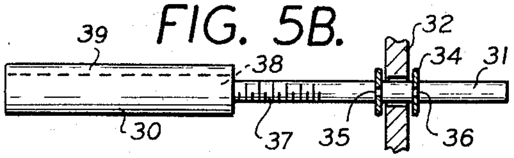

In FIGS. 4*a*, 4*b*, 5*a*, and 5*b*, there is shown the particular elements that go in part to make up the tunable structure as embodied in the invention as disclosed herein. In particular, FIGS. 4*a* and 4*b* show the plan and end views of a tubular glass or plastic dielectric member 25 carrying a pair of spaced and separate conductive sleeve members 26 and 27, the glass member having integral thereto a protruding head or ridge 28 extending axially the length of the said member. FIGS. 5*a* and 5*b* show the plunger 30 and shaft 31 which go further to complete the tunable assembly. In particular, there is shown the shaft 31 anchored in plate 32 and journaled therein, so as to freely rotate, but that no translatory or axial movement is possible because of the retaining washers 33, 34 surrounding the shaft on opposite sides of the said plate. The said washers are mounted in circumferential grooves 35, 36 and anchored thereto to assure no axial movement of the said shaft 31. As the shaft 31 rotates, its threadable portion 37 engages the threadable part of the internal surface 38 of tubular member 39 to effect its axial movement. The anchoring position of the shaft 31 to the plate 32 is important in the sense that the coefficient of expansion of both plate and shaft should be similar to assure freedom from drift of the tunable device because of temperature changes.

Referring to FIG. 3, there is shown therein another form of the invention herein and in particular comprises a plunger 40 surrounded by a tubular dielectric member 41, having attached thereto a pair of tubular conductive members 42, 43 axially aligned and concentric with the said plunger and dielectric member. Attached to and co-extensive with the conductive member 43 is a disc-like conductive pin 44 having centrally located an elongated protrusion like conductive member 45, the said protrusion extending inward toward the said plunger and disposed to being surrounded thereby. Further, the said protrusion may have a taper extending from the base outward in the plunger direction, to permit greater adjustment variations of the tunable elements. An adjustment screw 46 threaded into the center of the pin 47 is then used as a trimmer for setting the minimum parameter of the tunable elements.

Now to proceed to show an application of the invention as embodied herein, there is further shown in FIG. 1 the tunable structure, having a split stator capacitor 50, 51 surrounding the glass dielectric member 2, each stator capacitor member being connected to opposite ends 53, 54 of inductor coil 55, which coil surrounds the said dielectric member at a point intermediate its extremities and proximate to the location of the split stators. In operation, the plunger 3 effects a change in both the inductance of coil 55 and capacity of split capacitor 50, 51. In fact, the adjustment of the plunger very conveniently permits variations in both inductance and capacity so that suitable frequency tracking may be accomplished. This is easily seen from schematic drawing of FIG. 6 which is an equivalent circuit of FIG. 1. In particular, there is shown a stator-capacity coil combination 60 with the adjustable plunger 61 coupled thereto and connected to a meter measuring circuit consisting of a detector diode 62 and a pair of radio frequency chokes 63, 64 along with a meter 65. The chokes and capacitor 66 connected between the stator and diode act as a radio-frequency filtering circuit so as to permit suitable amplitude measurements by the meter. The said variable amplitude represents a direct measurement of the frequency variations of the tuned circuit.

There is further shown in FIG. 1 for embellishment purposes a calibration 70 etched in glass upon the dielectric tubular member 2 and a movable pointer 71 arranged to threadably move in an axial direction in accordance with the movement of the plunger 3, the said pointer in combination with the said calibrations providing visible means for determining the extent of the frequency variations produced by the tunable structure.

There is shown in FIGS. 7 and 7*a* another embodiment of the invention described herein and in particular provides conductive contact between stator and plunger so as to affect extended tunable frequency ranges of electrical signals by extending the available value of capacitance. The embodiment shown in the said figures comprises a structure similar to that shown in FIG. 1 with the exception of the construction of the split stator capacitor. In particular, the split stator capacitor 75 is comprised of a first metal collar 76 which concentrically surrounds the dielectric tubular member 77 as in FIG. 1, and a second metal collar 78 longitudinally displaced from the first metal collar and also surrounding the said dielectric member. The second metal collar 78 has one extremity thereof constructed, having a smaller diameter than the body of the collar, and flaring outwardly in the shape of a flask or some similar type of bottle. The flared portion of collar 78 has a series of longitudinally spaced slits so as to form a plurality of flexible fingers 79 disposed to move radially when used. The inner plunger 80 is in constant contact with the collar 78 along the fingered portion thereof, all during the axial traverse of the said plunger when being operated to vary the frequency of the electrical signals in accordance with the invention thereby increasing the surface area of stator 78 of split stator capacitor 75.

The fingered metal collar is made to fixedly adhere to the dielectric tubing by heat shrinking in the usual way, thereby forming an integral part thereof. Further, the plurality of fingers provides positive and smooth contact between the plunger and collar 78, thereby assuring positive, continuous and relatively noise-free signal frequency variations.

Having defined the invention, what is claimed is:

A tunable device for controlling the frequency of electrical signals comprising a hollow elongated tubular dielectric member having a pair of cylindrical electrodes arranged on said member side by side spaced from each other, with electrical field lines extending in a direction substantially parallel to said member, a conducting plunger slidably fitting into said member, and having along its surface a single incision of minimum cross sectional dimensions to reduce field distortion to a minimum, said incision extending into a direction substantially parallel to said field lines; said member having an internal ridge fitting into said incision and said plunger having an internal thread; and a screw of non-metallic material arranged rotatably in said plunger, cooperating with said thread so as to cause said plunger under control of said screw, when rotating, to move with respect to said electrodes in a direction substantially parallel to said field so as to translate the rotary movements of said screw into axial movements of the plunger relative to the said dielectric member to permit variations of said field and thereby cause variations in the frequency of the electrical signals.

References Cited by the Examiner

UNITED STATES PATENTS

| | | | |
|---|---|---|---|
| 2,147,425 | 2/1939 | Bock | 334—68 |
| 2,516,981 | 8/1950 | Hall et al. | 317—249 |
| 2,632,109 | 3/1953 | Chelgren | 334—68 X |
| 2,654,034 | 9/1953 | Morton | 334—70 |
| 2,698,387 | 12/1954 | Schuster | 334—68 |
| 2,871,345 | 1/1959 | Napolin | 334—81 |
| 2,980,797 | 4/1961 | Million | 334—66 |
| 2,989,630 | 6/1961 | Crooker | 334—68 |
| 3,071,716 | 1/1963 | Young | 317—248 |
| 3,135,936 | 6/1964 | Martin | 334—89 |

HERMAN KARL SAALBACH, *Primary Examiner.*

R. F. HUNT, *Assistant Examiner.*